Feb. 23, 1926.
L. R. ZIFFERER
ADJUSTABLE PIPE HANGER
Filed June 9, 1924
1,573,893
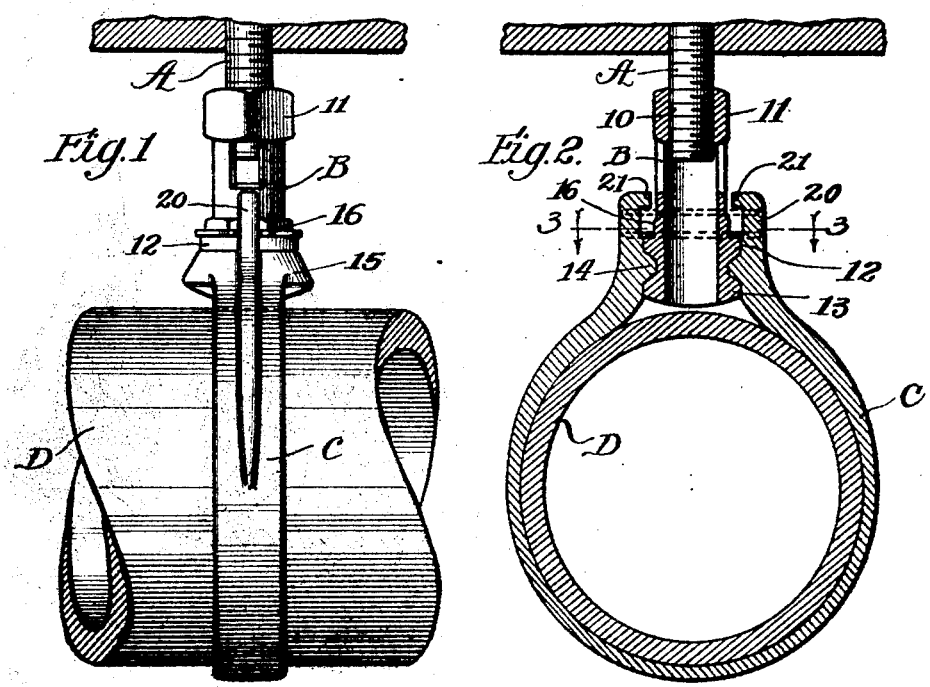
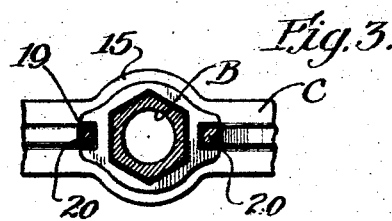
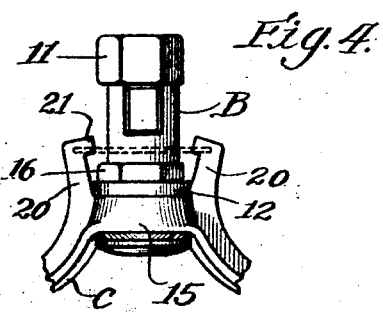
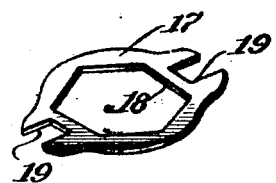
Inventor
Lothar R. Zifferer
By *[signature]* Atty's.

Patented Feb. 23, 1926.

1,573,893

UNITED STATES PATENT OFFICE.

LOTHAR R. ZIFFERER, OF COLUMBIA, PENNSYLVANIA.

ADJUSTABLE PIPE HANGER.

Application filed June 9, 1924. Serial No. 718,680.

*To all whom it may concern:*

Be it known that I, LOTHAR R. ZIFFERER, a citizen of the United States, residing at Columbia, in the county of Lancaster and State of Pennsylvania, have invented certain new and useful Improvements in Adjustable Pipe Hangers, of which the following is a specification.

This invention relates generally to a means of support such, for instance, as is particularly adapted for the suspension of overhead pipe lines of the kind commonly used in sprinkler systems for fire extinguishing purposes; and more particularly it is concerned with certain improvements in a device of the hanger type that is adjustable toward and from the wall, ceiling, or other fixed support to which it is attached.

The objects of this invention, briefly summarized, are to provide a hanger for the purpose mentioned (1) that may be produced and installed at small expense; (2) that may be adjusted as required to meet local conditions; (3) that is automatically locked in each adjusted position by the dropping of a gravity element; and (4) a structure in which the several components may be conveniently handled in a permanently assembled relation. Other objects, however, are also contemplated, as will more fully hereinafter appear from the description to follow.

An embodiment of this invention in a desirable form is illustrated in the accompanying drawing wherein—

Figure 1 is a side elevation of the hanger showing its relation to an attaching bolt as well as to the pipe which it is designed to carry;

Fig. 2 is a longitudinal section therethrough taken in a plane transverse to that of Fig. 1;

Fig. 3 is a cross section taken on line 3—3 of Fig. 2;

Fig. 4 is an elevation of the sleeve and adjacent portion of the carrier showing the lugs on the latter as distended to receive the locking element; and Fig. 5 is a detail in perspective of the locking element per se.

The present hanger is adapted for threaded connection with a bolt A which may be secured to a wall, ceiling, or other fixed structure by any appropriate means. The hanger itself consists of but two parts, one being a sleeve B having a swiveled connection with a carrier C which, as shown, is in the general form of an eye adapted to receive a pipe D. The sleeve is provided as at 10 with internal threads adapted to co-operate with the threads of the bolt A. Externally a portion of the sleeve may be polygonally formed as at 11 so as to provide a wrench hold. At its end which connects with the carrier C the sleeve is formed with a pair of spaced annular shoulders 12 and 13 between which is received an annular shoulder 14 extending inwardly from a collar 15 that is provided on the carrier. By some such means as have been suggested, a swiveled and inseparable connection is provided between the sleeve and the carrier.

The construction thus far described is one which is adapted for adjustable support of a pipe. Manifestly the position of the pipe relative to the attaching bolt may be adjusted through rotation of the sleeve. It is important, however, that means be provided for locking the sleeve in any desired rotative position, and if further adjustments are desired, that the sleeve should be free again to rotate. These results are attained in the present construction by the means following:

One of the two relatively rotatable parts—the sleeve or the carrier—is provided exteriorly at one point with a non-circular or eccentric formation which I prefer should be polygonal, as at 16 on the sleeve. Associated with this non-circular sleeve portion 16 is a locking element in the form of a plate or ring 17 having a co-operative internal periphery 18, here represented as polygonal. Such an element is adapted to engage non-rotatably with the sleeve when positioned adjacent its portion 16. Extended from opposite sides of the locking element are yokes 19 each adapted to engage slidingly with a guide in the form of a lug 20 which upstands from the other rotatable part, here represented as the carrier collar 15. An inwardly protecting lip 21 formed at the free end of each lug serves to prevent disassociation of the locking element from the hanger. During the process of manufacture, however, this element may be slipped into place with the lugs bent back, as shown in Fig. 4, following which the lugs are straightened up to final position, as in Fig. 2. The locking element is then secured permanently, although slidingly, in place.

From the preceding description, it will be apparent that the locking element will normally rest on the carrier shoulder 12, its two yokes 19 being engaged with the guides 20 which upstand from the carrier. In this position of rest, the locking element is also engaged non-rotatably with the sleeve B so as to prevent its being further adjusted upon the bolt A. This relationship of the parts, however, may be changed by lifting the locking element to the limit of its movement which is determined by the two inwardly projecting lips 21. In this position the locking element is clear of the formation 16 so that the sleeve may be freely rotated to effect a desired height adjustment of the pipe. Thereafter the locking element is allowed to drop back to its normal position of rest upon the shoulder 12 whereupon the parts are secured against further movement for an indefinite period.

A pipe hanger having the improvements noted is extremely simple to install and adjust. It requires no tools other than a plain implement for rotating the sleeve. As all of its components are assembled permanently in place, there are no parts which can become lost or mislaid. The hanger is further adjustable at any time that the locking element is manually lifted from its seat. All these advantages are embodied in a structure which is economical to produce and which is calculated to render durable and satisfactory service.

I claim:

1. In a pipe hanger, the combination with a threaded sleeve having a swiveled connection with a carrier, of independent means mounted on the carrier for sliding movement longitudinally of the sleeve, said means being adapted in one position to lock non-rotatably with the sleeve and elsewhere to disengage therefrom, substantially as described.

2. A pipe hanger having a sleeve in swiveled connection with a carrier, polygonal means extended from the sleeve adjacent the carrier, a locking element adapted to engage with said polygonal means when positioned adjacent the carrier, and guiding means in which the locking element is slidably secured adapted to permit movement of the latter to a position of disengagement relative to the sleeve, substantially as described.

3. A pipe hanger having a carrier and a sleeve in swiveled relation, guiding means extended from one to the other, an eccentric member on the latter, and a locking element confined by the guiding means and movable toward the eccentric member for engagement therewith whereby the sleeve and carrier are held against relative movement, substantially as described.

4. A pipe hanger in which is combined a sleeve and carrier in swiveled relation, guiding means extending from one of these parts to the other, a locking element slidably held by the guiding means and movable from one part toward the other, and co-operative means on the locking element and the part toward which the guiding means is extended whereby rotation of said latter part is prevented when the locking element is moved adjacent thereto, substantially as described.

5. The combination with a sleeve and carrier connected for swiveling, of a seat on the carrier, eccentric means on the sleeve adjacent the seat, a plate adapted to rest on the seat and to lock with said eccentric means, and a mounting in which the plate is slidably confined permitting the latter to move from its seat and from locking relation with the eccentric means whereby the sleeve is then free to rotate, the plate when returned to its position on the seat being re-engaged with said eccentric means and acting to prevent rotation of said sleeve, substantially as described.

6. In a pipe hanger, the combination with a threaded sleeve having a swiveled connection with a carrier, of a pair of lugs upstanding from the carrier adjacent the sleeve, each lug having an inturned lip at its upper extremity, a yoked plate slidably arranged between the two lugs and confined thereby, and means on the plate and sleeve adapted to interlock when the plate is in one longitudinal position and to disengage when the plate is in another longitudinal position, the plate thereby serving at times to hold the sleeve against rotation relative to the carrier, substantially as described.

LOTHAR R. ZIFFERER.